Dec. 3, 1929. W. F. RICHARDS 1,738,020
DRAFT RIGGING
Filed Sept. 7, 1927
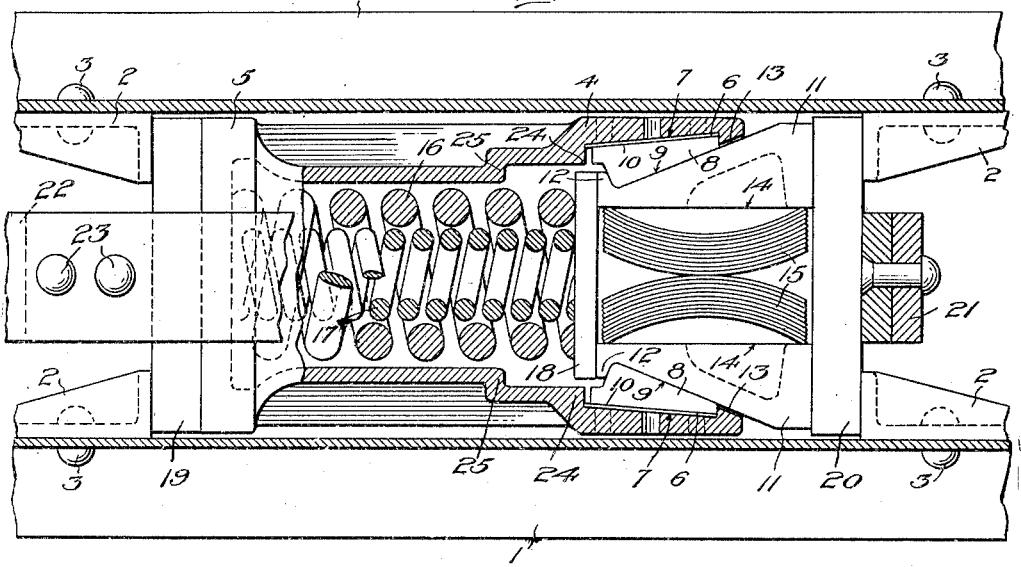
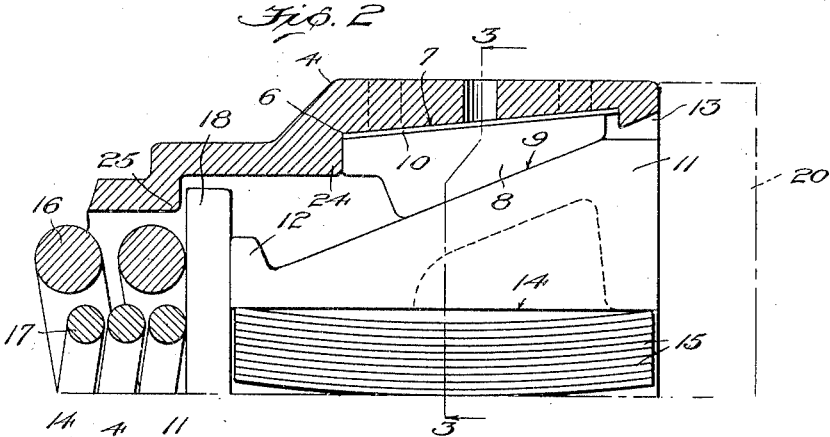
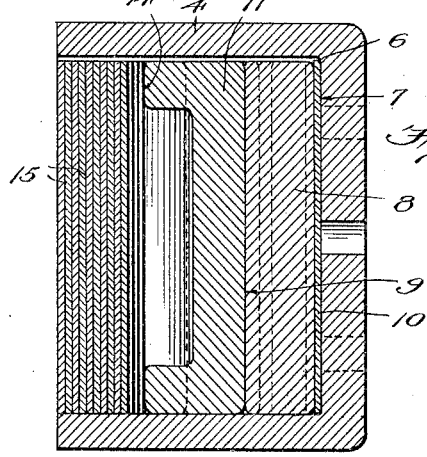
Inventor
Willard F. Richards Patented Dec. 3, 1929

1,738,020

UNITED STATES PATENT OFFICE

WILLARD F. RICHARDS, OF DEPEW, NEW YORK, ASSIGNOR TO THE GOULD COUPLER COMPANY, OF NEW YORK, N. Y., A CORPORATION OF MARYLAND

DRAFT RIGGING

Application filed September 7, 1927. Serial No. 213,040.

This invention relates to cushioning mechanism and, more particularly, to such adapted for use with railway draft rigging.

The principal object of my invention, generally considered, is to provide a friction draft gear adapted for use with railway cars, said gear being particularly designed to eliminate sticking as well as to provide for smoothness of operation.

An object of my invention is the provision of friction draft gear involving a housing closed at one end and open at the other, said open end being formed in opposite side walls thereof with inwardly opening recesses, the outer walls defining said recesses being converging toward each other from the open end of said housing, removable wear plates seated in said recesses and adapted for limited longitudinal movement with respect to the housing, the inner surfaces of said wear plates providing inclined friction surfaces on the housing, wedge blocks with correspondingly inclined friction surfaces engaging the friction surfaces on the wear plates, and resilient means for forcing said wedge blocks apart into engagement with said wear plates as well as for resisting movement of said wedge blocks into said housing.

Another object of my invention is the provision of friction draft gear involving a casing or housing, the inclined friction surfaces of which are provided by movable wear plates, said wear plates engaging the housing or casing along inclined walls thereof, and anti-friction means preferably comprising hard brass liners disposed between said wear plates and the casing for obviating sticking of the gear.

A further object of my invention is the provision of cushioning mechanism, particularly adapted for use with railway draft rigging, involving a housing or casing containing resilient means and frictional means, said resilient means preferably comprising springs resisting inward movement of the friction means, said friction means preferably comprising two pairs of wedging friction blocks, the outer pair engaging slightly inclined walls on the casing and the inner pair engaging walls of the outer pair inclined to a greater degree, said outer pair interlocking with the casing for limiting movement thereof and said inner pair interlocking with the outer pair for limiting outward movement thereof.

A still further object of my invention is the provision of friction draft gear involving a friction casing inclosing resilient means and two pairs of friction blocks, the outer pair of friction blocks engaging friction surfaces on the casing and the inner pair of friction blocks engaging friction surfaces on the outer pair, anti-friction means disposed between the friction surfaces on the outer pair of blocks and the casing, and the angle of the friction surfaces between the outer friction blocks and casing being less than the angle of the friction surfaces between the inner and outer pairs of friction blocks, whereby, upon compression of the gear, movement is effected first between the outer pair of friction blocks and the casing and, upon release of the gear, movement is likewise effected between the same parts to obviate sticking of the gear.

Other objects and advantages of the invention relating to the particular arrangement and construction of the various parts will become apparent as the description proceeds.

Referring to the drawings illustrating my invention, the scope whereof is defined by the appended claims:

Figure 1 is a plan view, partly in horizontal section, illustrating one embodiment of my invention and showing my cushioning mechanism in open or release position.

Figure 2 is a fragmentary sectional view of the form of cushioning mechanism illustrated in Figure 1 and showing the same in compressed or stressed position.

Figure 3 is a transverse sectional view on the line 3—3 of Figure 2 looking in the direction of the arrows.

Referring to the drawings in detail, like parts being designated by like reference characters, there are illustrated parts of a railway draft rigging disposed between the draft or center sills 1 of a car, motion with respect thereto being limited by ordinary draft lugs or stops 2 connected to the webs of the sills 1 of said car by rivets or other securing means 3. The gear in the present embodiment involves a casing or housing 4 closed at one end by a wall 5 and formed adjacent the other end with inwardly opening recesses or pockets 6.

The recesses 6 are preferably defined by longitudinally extending walls 7, the inner surfaces of which are preferably converging inwardly with respect to each other from the open end of the housing and, in the present embodiment, are shown as inclined at an angle of approximately five degrees with respect to the longitudinal center line thereof. Received in said pockets or recesses 6 are removable wear plates or outer friction blocks 8 which are slightly shorter than the length of said recesses, whereby limited longitudinal movement therebetween is permitted. The inner surfaces of said wear plates 8 provide inclined friction surfaces 9 which, in the present embodiment when in place, are inclined approximately twenty-two degrees with respect to the longitudinal center line of the housing. It will, therefore, be apparent that the inclination illustrated in the present embodiment between the inner and outer faces of the wear plates 8 is approximately seventeen degrees.

In order to minimize friction between the wear plates 8 and the casing 4, anti-friction means 10 preferably comprising hard brass plates are disposed between said casing and wear plates. Said plates 10 are preferably of the same length as the pockets so that the motion provided is between the wear plates and brass plates rather than between the brass plates and casing. In order to increase the life of the wear plates, the same are preferably case-hardened all over.

Cooperating with the wear plates 8 are friction wedge blocks or inner friction blocks 11, the outer surfaces of which are preferably inclined at an angle corresponding with the inner surfaces 9 of the wear plates and on the inner end of each is a flange or lug 12 which cooperates with the inner ends of the wear plates 8 to limit outward movement of said wedge blocks 11. In order to provide for engagement between the wedge blocks and wear plates rather than between the wedge blocks and casing, a slight clearance is formed between the outer end of the casing and said wedge blocks as indicated at 13. The inner or adjacent faces 14 of the wedge blocks 11 are preferably arranged parallel with respect to each other when in place and resilient means, preferably comprising two sets of curved plate springs 15, are disposed between said blocks for urging them away from each other and into engagement with the wear plates 8.

Positioned between the end 5 of the casing and the inner ends of the wedge blocks 11 is resilient means preferably involving helical springs 16 and 17. The outer ends of said springs preferably engage a follower 18 positioned between the same and the ends of said wedge blocks 11, whereby said blocks are urged longitudinally and outwardly of the casing.

The gear described may be employed with a front follower 19 and rear follower 20 and is shown associated with a vertical yoke 21, the front ends of which are connected to the butt of a coupler 22 by means of rivets 23. However, I do not wish to be limited to this showing nor is it essential that my gear be employed with the closed end of the casing 5 forwardly as the same may be reversed end to end if desired. It will also be understood that, when used with a horizontal yoke, the gear is preferably rotated ninety degrees about its longitudinal axis or, in other words, is positioned with the wear plates and friction blocks vertically arranged with respect to each other rather than horizontally.

The operation of my cushioning mechanism is as follows. Upon either draft or buffing force being applied to the gear so that relative movement toward each other is effected between the wedge blocks 11 and the casing 4, said wear plates first move inwardly on said brass plates with the wedge blocks until they abut the inner shoulders 24 on the casing, after which the wedge blocks 11 move inwardly, sliding over the friction surfaces 9 on the wear plates to the position illustrated in Figure 2. This initial movement between the wear plates 8 and the brass plates takes place not only because of the small angularity of the friction surfaces involved but because of the smaller coefficient of friction between steel and brass than between steel and steel. It will be apparent that, during compression of the gear, the initial resistance is relatively small due not only to the sliding of the wear plates on the brass plates but because of the relatively slight inclination of said brass plates and engaging surfaces on the wear plates. After the initial motion, the wear plates are stopped moving by the shoulders 24 and compression of the gear is effected along the steeper inclined surfaces 9 so that a greater resistance is then offered by said gear not only on account of the increased angularity but because of the increased coefficient between the friction surfaces. The shoulders 25 in the casing are adapted to provide ultimate stops for compressive motion of the gear, thereby saving the springs 16 and 17 from undue strain.

Upon release of the gear, sticking thereof is obviated by the anti-friction means or brass plates 10 permitting an initial movement of the wear plates and associated friction blocks, said initial movement being sufficient to start release between the wedge blocks and wear plates. It will, therefore, be apparent that not only does my gear provide for what might be termed a two-stage compression and release due to provision for movement not only of the wedge blocks but also of the wear plates but, on account of the reduced friction between the wear plates and casing, release of the gear is facilitated and sticking minimized.

Although I have illustrated and described in detail a particular embodiment of my invention, it is to be understood that I do not wish to be limited to the details as the angularity of the friction surfaces may be varied, if desired, to meet different conditions and the permitted travel of the outer friction elements or wear plates may likewise be changed. It should also be understood that, if desired, the brass liner may be omitted and the angularity of the outer friction surfaces on the wear plates and the corresponding walls of the casing may be increased to equal or exceed that of the friction surfaces on the wedge blocks or inner friction elements, and I desire to be limited only by the spirit and scope of the appended claims.

Having now described my invention, I claim:

1. Cushioning mechanism adapted for use with railway draft rigging comprising a housing having recesses therein, a wall of each recess being inclined to the longitudinal axis of said housing, a removable wear plate engaging each of said walls, friction mechanism and a spring within said housing, said mechanism comprising a plurality of pairs of wedging friction blocks, and a friction producing spring interposed between said pairs, the blocks of one of said pairs having portions interlocking with the adjacent blocks of the said other pair.

2. Cushioning mechanism adapted for use with railway draft rigging comprising a housing provided with oppositely disposed inwardly opening recesses, the outer walls defining said recesses being inwardly converging from the end of said housing, a wear plate seated in each recess and movable longitudinally along said inclined wall, the inner faces of said wear plates providing inclined replaceable friction surfaces, friction wedge blocks provided with correspondingly inclined friction surfaces slidable on the friction surfaces of the wear plates, resilient means positioned between said wedge blocks for urging them against said wear plates, and resilient means disposed in said housing for resisting inward movement of said blocks.

3. Cushioning mechanism adapted for use with railway draft rigging comprising a housing having recesses therein adjacent one end thereof, the longitudinally extending walls of said recesses being inclined with respect to the longitudinal axis of said housing, movable wear plates positioned in said recesses for limited longitudinal movement therein, anti-friction means disposed between said wear plates and the inclined walls of said recesses, the inner faces of said wedge blocks providing inclined friction surfaces, wedge blocks with correspondingly inclined friction surfaces cooperating with the friction surfaces on the wear plates, resilient means for urging said wedge blocks against said wear plates, and resilient means disposed in said housing and engaging the inner ends of said wedge blocks for resisting movement thereof longitudinally of said housing.

4. Cushioning mechanism adapted for use with railway draft rigging comprising a housing inclosing resilient means and inner and outer pairs of friction blocks, the outer pair of friction blocks engaging friction surfaces on the casing and the inner pair of friction blocks engaging friction surfaces on the outer pair, anti-friction means positioned between the friction surfaces on the outer pair of blocks and the casing, the angle of said friction surfaces, between the outer friction blocks and casing, being less than the angle of the friction surfaces between the inner and outer pairs of friction blocks, and resilient means urging said inner pair of friction blocks into engagement with outer pair of friction blocks.

5. Cushioning mechanism adapted for use with railway draft rigging comprising a housing inclosing resilient gear releasing means and friction means, said friction means comprising an inner pair of wedging friction blocks and an outer pair of friction blocks, the outer pair of blocks engaging slightly inclined walls on the casing and the inner pair engaging walls on the outer pair inclined to a greater degree, said outer pair interlocking with the housing for limiting movement thereof and said inner pair interlocking with said outer pair to limit outward movement thereof, and resilient means between the friction blocks of the inner pair to urge the same into frictional engagement with those of the outer pair.

6. Cushioning mechanism adapted for use with railway draft rigging comprising a housing closed at one end and open at the other, friction surfaces provided adjacent the open end by wear plates movable with respect to said housing, wedge blocks engaging said wear plates, resilient means between said wedge blocks for urging the same against the wear plates, and brass liners disposed between said wear plates and housing for reducing friction therebetween.

7. Cushioning mechanism adapted for use with railway draft rigging comprising a housing closed at one end and open at the other, said open end being formed in opposite side walls with inwardly opening recesses, the outer walls defining said recesses being inclined toward each other from the open end of the housing, removable wear plates seated in said recesses and adapted for limited longitudinal movement with respect to the housing, the inner surfaces of said wear plates providing inclined friction surfaces on the housing, wedge blocks with correspondingly inclined friction surfaces engaging the friction surfaces on the wear plates, curved leaf springs disposed between said wedge blocks for urging the same into engagement with said wear plates, and resilient means positioned between said wedge blocks and the closed end of said housing to effect release of the mechanism.

In testimony whereof I affix my signature.

WILLARD F. RICHARDS.